United States Patent
Platt

(10) Patent No.: US 6,380,929 B1
(45) Date of Patent: Apr. 30, 2002

(54) PEN DRAWING COMPUTER INPUT DEVICE

(75) Inventor: John C. Platt, Fremont, CA (US)

(73) Assignee: Synaptics, Incorporated, San Jose, CA (US)

( * ) Notice: Subject to any disclaimer, the term of this patent is extended or adjusted under 35 U.S.C. 154(b) by 0 days.

(21) Appl. No.: 08/717,435

(22) Filed: Sep. 20, 1996

(51) Int. Cl.$^7$ ............................................... G09G 5/00
(52) U.S. Cl. ....................................... 345/173; 341/34
(58) Field of Search ................................ 345/173–174, 345/178–180, 358, 18.01, 18.02, 18.03, 145, 157, 168, 179, 326; 178/18.01, 18.02, 18.03, 19, 20; 708/146; 364/707; 341/34; 713/323

(56) References Cited

U.S. PATENT DOCUMENTS

| | | |
|---|---|---|
| 2,219,497 A | 10/1940 | Stevens et al. |
| RE23,030 E | 8/1948 | Holt |
| 3,128,458 A | 4/1964 | Romero |
| 3,207,905 A | 9/1965 | Bray |
| 3,244,369 A | 4/1966 | Nassimbene |
| 3,401,470 A | 9/1968 | Gaven |
| 3,437,795 A | 4/1969 | Kuljian |
| 3,482,241 A | 12/1969 | Johnson |
| 3,492,440 A | 1/1970 | Cerbone et al. |
| 3,493,791 A | 2/1970 | Adelson et al. |
| 3,497,617 A | 2/1970 | Ellis et al. |
| 3,497,966 A | 3/1970 | Gaven |

(List continued on next page.)

FOREIGN PATENT DOCUMENTS

| | | | | |
|---|---|---|---|---|
| EP | 0 187 372 | 12/1985 | ............ | G01B/7/00 |
| EP | 0 490 001 | 6/1992 | ............ | G06F/3/033 |
| EP | 0 609 021 | 7/1993 | ............ | G06K/11/16 |

(List continued on next page.)

OTHER PUBLICATIONS

Spider et al., Bill "SuperPaint" Manual pp. ii–91, 1987.*
"Double–Click Generation Method for Pen Operations", IBM Technical Disclosure Bulletin, Nov. 1992, vol. 35, No. 6, p. 3.
"Three–Axis Touch Sensitive Pad", IBM Technical Disclosure Bulletin, Jan. 1987, vol. 29, No. 8, pp. 3451–3453.
Chun, et al., "A High–Performance Silicon Tactile Imager Based on a Capacitive Cell", IEEE Transactions on Electron Devices, Jul. 1985, vol. ED–32, No. 7, pp. 1196–1201.
Tiburtius, "Transparente Folientastaturen", Feinwerktechnik & Messtechnik 97, Jul. 1989, No. 7, pp. 299–300.

*Primary Examiner*—Richard Hjerpe
*Assistant Examiner*—Frances Nguyen
(74) *Attorney, Agent, or Firm*—Sierra Patent Group, Ltd.

(57) ABSTRACT

A method and system are provided for drawing or writing using an input device in computer systems. The system provides an absolute-coordinate drawing mode, in which the user may draw written strokes to which the computer system display is responsive, and a relative-coordinate repositioning mode, in which the user may figuratively "pick up the pen" and reposition the beginning of a following written stroke. The system enters the drawing mode in response to a user command, and remains in the drawing mode in response to continued written strokes. The system enters the cursor mode after a selected time period occurs with no written strokes, or in response to other user commands. In the drawing mode, a coordinate system for the touchpad is mapped to a coordinate system for a selected window on the display. The mapping is selected so that an initial position of a written stroke in the window corresponds to a final position selected during the cursor mode, so that the user is able to reposition the input device when it has (or is about to) "run off the edge" of an input tablet which is relatively smaller than the display. The system uses either a resistive touchpad input tablet, or a capacitive touchpad input tablet in conjunction with a passive stylus input device having a flexible conductive writing tip. The system alternatively provides a signature mode, in which the user is able to make a simple drawing, such as a handwritten signature.

2 Claims, 4 Drawing Sheets

U.S. PATENT DOCUMENTS

| | | |
|---|---|---|
| 3,516,176 A | 6/1970 | Cleary et al. |
| 3,522,664 A | 8/1970 | Lambright et al. |
| 3,530,310 A | 9/1970 | Adelson et al. |
| 3,543,056 A | 11/1970 | Klein |
| 3,549,909 A | 12/1970 | Adelson et al. ............. 307/252 |
| 3,593,115 A | 7/1971 | Dym et al. .................... 323/93 |
| 3,598,903 A | 8/1971 | Johnson et al. ............... 178/18 |
| 3,662,378 A | 5/1972 | MacArthur .......... 340/347 DD |
| 3,675,239 A | 7/1972 | Ackerman et al. .......... 340/365 |
| 3,683,371 A | 8/1972 | Holz .......................... 340/365 |
| 3,696,409 A | 10/1972 | Braaten ...................... 340/365 |
| 3,732,389 A | 5/1973 | Kaelin et al. ........... 200/167 A |
| 3,737,670 A | 6/1973 | Larson ....................... 307/116 |
| 3,757,322 A | 9/1973 | Barkan et al. .......... 340/365 C |
| 3,760,392 A | 9/1973 | Stich .......................... 340/200 |
| 3,773,989 A | 11/1973 | Hacon .................... 200/52 R |
| 3,875,331 A | 4/1975 | Halsenbalg .................. 178/19 |
| 3,921,166 A | 11/1975 | Volpe ..................... 340/365 C |
| 3,931,610 A | 1/1976 | Marin et al. ............. 340/172.5 |
| 3,932,862 A | 1/1976 | Graven .................. 340/324 M |
| 3,974,332 A | 8/1976 | Abe et al. ...................... 178/18 |
| 3,992,579 A | 11/1976 | Dym et al. ................... 178/18 |
| 3,999,012 A | 12/1976 | Dym ........................... 178/18 |
| 4,056,699 A | 11/1977 | Jordan ....................... 200/5 A |
| 4,058,765 A | 11/1977 | Richardson et al. ...... 324/61 R |
| 4,071,691 A | 1/1978 | Pepper, Jr. .................... 178/19 |
| 4,087,625 A | 5/1978 | Dym et al. ................... 178/19 |
| 4,103,252 A | 7/1978 | Bobick ........................ 331/48 |
| 4,129,747 A | 12/1978 | Pepper, Jr. ................... 178/19 |
| 4,148,014 A | 4/1979 | Burson ....................... 340/709 |
| 4,177,354 A | 12/1979 | Mathews ..................... 178/18 |
| 4,177,421 A | 12/1979 | Thornburg ................ 324/61 R |
| 4,198,539 A | 4/1980 | Pepper, Jr. ................... 178/18 |
| 4,221,975 A | 9/1980 | Ledniczki et al. .......... 307/116 |
| 4,224,615 A | 9/1980 | Penz ......................... 340/712 |
| 4,246,452 A | 1/1981 | Chandler .................... 200/5 A |
| 4,257,117 A | 3/1981 | Besson ........................ 368/69 |
| 4,264,903 A | 4/1981 | Bigelow ................. 340/365 C |
| 4,281,323 A | 7/1981 | Burnett et al. .............. 340/712 |
| 4,290,052 A | 9/1981 | Eichelberger et al. .. 340/365 C |
| 4,290,061 A | 9/1981 | Serrano ...................... 340/712 |
| 4,291,303 A | 9/1981 | Cutler et al. ................ 340/711 |
| 4,293,734 A | 10/1981 | Pepper, Jr. ................... 178/18 |
| 4,302,011 A | 11/1981 | Pepper, Jr. ................... 273/85 |
| 4,310,839 A | 1/1982 | Schwerdt .................... 340/712 |
| 4,313,113 A | 1/1982 | Thornburg .................. 340/709 |
| 4,334,219 A | 6/1982 | Paülus et al. ............... 340/712 |
| 4,371,746 A | 2/1983 | Pepper, Jr. ................... 178/18 |
| 4,398,181 A | 8/1983 | Yamamoto .............. 340/365 S |
| 4,423,286 A | 12/1983 | Bergeron ..................... 178/19 |
| 4,430,917 A | 2/1984 | Pepper, Jr. ................... 84/1.01 |
| 4,442,317 A | 4/1984 | Jandrell ...................... 178/18 |
| 4,455,452 A | 6/1984 | Schuyler ..................... 178/18 |
| 4,475,235 A | 10/1984 | Graham ........................ 382/3 |
| 4,476,463 A | 10/1984 | Ng et al. .................... 340/712 |
| 4,511,760 A | 4/1985 | Garwin et al. ............... 178/18 |
| 4,550,221 A | 10/1985 | Mabusth ...................... 178/18 |
| 4,554,409 A | 11/1985 | Mitsui et al. ................. 178/19 |
| 4,570,149 A | 2/1986 | Thornburg et al. .......... 338/114 |
| 4,582,955 A | 4/1986 | Blesser ........................ 178/19 |
| 4,595,913 A | 6/1986 | Aubuchon ................. 340/365 |
| 4,616,107 A | 10/1986 | Abe et al. ..................... 178/18 |
| 4,639,720 A | 1/1987 | Rympalski et al. ......... 340/712 |
| 4,672,154 A | 6/1987 | Rodgers et al. ............... 178/19 |
| 4,680,430 A | 7/1987 | Yoshikawa et al. ........... 178/19 |
| 4,686,332 A | 8/1987 | Greanias et al. .............. 178/19 |
| 4,733,222 A | 3/1988 | Evans ....................... 340/365 C |
| 4,734,685 A | 3/1988 | Watanabe ................... 340/710 |
| 4,736,191 A | 4/1988 | Matzke et al. .......... 340/365 C |
| 4,737,773 A * | 4/1988 | Kobayashi ................... 345/173 |
| 4,758,690 A | 7/1988 | Kimura ...................... 178/19 |
| 4,766,423 A | 8/1988 | Ono et al. ................... 340/709 |
| 4,788,385 A | 11/1988 | Kimura ...................... 178/19 |
| 4,794,208 A | 12/1988 | Watson ....................... 178/19 |
| 4,817,034 A * | 3/1989 | Hardin, Sr. et al. ...... 178/18.03 |
| 4,820,886 A | 4/1989 | Watson ....................... 178/19 |
| 4,853,498 A | 8/1989 | Meadows et al. ............. 178/19 |
| 4,914,624 A | 4/1990 | Dunthorn ................... 364/900 |
| 4,918,262 A | 4/1990 | Flowers et al. ............... 178/18 |
| 4,922,061 A | 5/1990 | Meadows et al. ............. 178/19 |
| 4,935,728 A | 6/1990 | Kley .......................... 340/709 |
| 4,988,982 A | 1/1991 | Rayner et al. ............... 340/706 |
| 5,016,008 A | 5/1991 | Gruaz et al. ................... 341/33 |
| 5,120,907 A | 6/1992 | Shinbori et al. .............. 478/18 |
| 5,146,049 A * | 9/1992 | Shima ........................ 345/173 |
| 5,149,919 A | 9/1992 | Greanias et al. .............. 178/19 |
| 5,164,713 A | 11/1992 | Bain .......................... 340/710 |
| 5,194,862 A | 3/1993 | Edwards ...................... 341/20 |
| 5,220,649 A * | 6/1993 | Forcier ...................... 707/541 |
| 5,231,450 A | 7/1993 | Daniels ........................ 355/27 |
| 5,239,140 A | 8/1993 | Kuroda et al. ............... 178/18 |
| 5,260,697 A * | 11/1993 | Barrett et al. ............... 345/173 |
| 5,270,711 A | 12/1993 | Knapp ......................... 341/34 |
| 5,272,470 A * | 12/1993 | Zetts ......................... 345/173 |
| 5,327,161 A | 7/1994 | Logan et al. ................ 345/157 |
| 5,369,227 A | 11/1994 | Stone .......................... 178/18 |
| 5,373,118 A | 12/1994 | Watson ....................... 178/19 |
| 5,374,787 A | 12/1994 | Miller et al. .................. 178/18 |
| 5,408,593 A | 4/1995 | Kotaki et al. ............... 395/122 |
| 5,455,906 A * | 10/1995 | Usuda ........................ 345/179 |
| 5,488,204 A | 1/1996 | Mead et al. .................. 178/18 |
| 5,517,578 A * | 5/1996 | Altman et al. .............. 345/179 |
| 5,530,879 A * | 6/1996 | Crump et al. ............... 713/323 |
| 5,543,588 A | 8/1996 | Bisset et al. .................. 178/18 |
| 5,642,131 A * | 6/1997 | Pekelney et al. ............ 345/145 |
| 5,666,113 A * | 9/1997 | Logan ......................... 341/34 |
| 5,764,218 A * | 6/1998 | Della Bona et al. ......... 345/157 |
| 5,861,583 A | 1/1999 | Schediwy et al. ........ 178/18.06 |
| 5,880,411 A | 3/1999 | Gillespie et al. ......... 178/18.01 |
| 5,914,465 A | 6/1999 | Allen et al. .............. 178/18.06 |
| 5,942,733 A | 8/1999 | Allen et al. .............. 178/18.01 |
| 6,028,271 A | 2/2000 | Gillespie et al. ......... 178/18.01 |

FOREIGN PATENT DOCUMENTS

| | | | |
|---|---|---|---|
| EP | 0 574 213 | 12/1993 | ........... G06K/11/16 |
| FR | 2 662 528 | 5/1990 | ........... G06K/11/16 |
| GB | 2 139 762 | 11/1984 | ........... G06F/3/033 |
| GB | 2139762 A * | 11/1984 | |
| GB | 2 266 038 | 10/1993 | ........... G06F/3/033 |
| JP | 60 205625 | 10/1985 | ............. G06F/3/03 |
| JP | 62 126427 | 6/1987 | ............. G06F/3/03 |
| JP | 62 126428 | 6/1987 | ............. G06F/3/03 |
| JP | 63 073415 | 4/1988 | ........... G06F/3/033 |
| JP | 0 040614 | 2/1990 | ........... G02G/1/133 |
| JP | 04 015725 | 1/1992 | ........... G06F/3/033 |
| JP | 06 139022 | 5/1994 | ........... G06F/3/033 |
| WO | 91/03039 | 8/1989 | ............. G09G/3/02 |
| WO | 91/05327 | 4/1991 | ............. G09G/3/02 |

* cited by examiner

PEN DRAWING COMPUTER INPUT DEVICE

BACKGROUND OF THE INVENTION

1. Field of the Invention

The present invention relates to computer input devices. More particularly, the present invention relates to computer input devices which are suitable for making drawings with a pen, stylus, or finger.

2. The Prior Art

In a computer system having software for drawing, painting, or otherwise entering picture information, a user of the computer system will often desire to use an input device to draw pictures, write, or execute a signature, etc. In such cases it would be advantageous if the input device could emulate the drawing or writing behavior of a physical device with which the user is familiar, such as a physical pen with ink. When the input device acts in an unfamiliar manner, drawings created by the user may be sloppy or ill-formed and may thus result in user dissatisfaction.

One aspect of the behavior of a physical pen is that it applies ink in a written stroke, immediately visible to the user, when a writing point of the physical pen is applied to paper. At any time, the user is able to pick up the physical pen and place it elsewhere on the paper, so as to begin a new written stroke, and the user is able to determine the new location of the pen in response to written strokes which have already been drawn on the paper. One problem which has arisen in the art is that the computer system and the input device do not provide a convenient method for allowing the user to "pick up the pen" and continue to draw in a new position accurately selected by the user in response to written strokes which have already been drawn.

One known method for emulating a physical pen in a computer system is to couple an input device with a computer display, and to integrate the writing behavior of the input device with the display, so that the surface which the user appears to be drawing upon is itself dynamically responsive to drawing strokes made by the user. See, e.g., U.S. Pat. No. 4,639,720 to Rympalski. While this method achieves the advantages of providing feedback to the user for written strokes, and of allowing the user to place the input device in a relatively exact relationship with written strokes which have already been drawn, it suffers from the drawbacks that such displays are relatively expensive and that such displays require relatively sophisticated transparent input device technology. For example, an input drawing tablet integrated with a video display can cost half as much as the computer to which it is connected. These limitations tend to restrict use of this technology to a very limited group.

A second known method for emulating a physical pen in a computer system is to provide an input tablet and stylus, in which the input tablet is capable of detecting proximity of the stylus and transmitting information regarding written strokes to a computer system for display on a monitor. An example of such a device is the Art Pad II product, available from Wacom Technology Corporation of Vancouver, Wash. While this method is relatively less expensive, it is also less successful at providing feedback to the user for written strokes, and in allowing the user to place the input device in a relatively exact relationship with written strokes which have already been drawn, because the user must draw or write with the input device on the tablet, while looking elsewhere (at the monitor) for feedback. This method also suffers from the drawback that the stylus requires electronic circuitry to assist proximity detection by the tablet. If the input device is tethered to provide an electrical connection, its ease of use and naturalness can be significantly degraded, while if the input device is not tethered, it can easily be lost, which can be quite expensive.

A third method for emulating a physical pen in a computer system is to provide a stylus having a switch which activates when a selected pressure threshold is exceeded, and which is coupled to the computer system for processing. Thus, when the user exerts relatively heavy pressure, the computer system will treat the stylus as a drawing device for creating written strokes, while when the user exerts only relatively light pressure, the computer system will merely reposition its reference point for the stylus (represented by a cursor) and allow the user to begin a written stroke from a new position.

While this method achieves the advantages of providing feedback to the user for written strokes, and in allowing the user to place the input device in a relatively exact relationship with written strokes which have already been drawn, it suffers from the drawback that it is very difficult for the user to control the exact amount of pressure being exerted, and thus causes inadvertent switching between a drawing mode and a repositioning mode, which may thus result in user dissatisfaction.

Accordingly, it would be desirable to provide a method and system for drawing or writing using a stylus as an input device in computer systems.

It is therefore an object of the present invention to provide an inexpensive input device for creating drawings on computers.

It is a further object of the present invention to provide an inexpensive input device for creating drawings on computers which eliminates the accidental switching between cursor mode and inking mode.

Yet another object of the present invention is to provide a system and method for allowing drawings to be made with relatively small tablets.

The advantages of the present invention are achieved in an embodiment of the invention in which switching between a drawing mode and a repositioning mode is convenient and natural, while using only a relatively inexpensive passive stylus and even while using a tablet or touchpad having a substantially smaller size than the computer system display.

SUMMARY OF THE INVENTION

The invention provides a method and system for drawing or writing using a passive stylus input device in computer systems. The system provides an absolute-coordinate drawing mode, in which the user may draw written strokes to which the computer system display is responsive, and a relative-coordinate repositioning mode (herein sometimes called a "cursor" mode), in which the user may figuratively "pick up the pen" and reposition the beginning of a following written stroke. The system enters the drawing mode in response to a user command (such as a drawing gesture, tap performed on the input tablet, or selected keyboard command), and remains in the drawing mode in response to continued written strokes. The system enters the cursor mode after a selected time period occurs with no written strokes, or in response to other system events (such as keyboard input).

In the drawing mode, a coordinate system for the touchpad is mapped to a coordinate system for a selected window on the display. The mapping is selected so that an initial position of a written stroke in the window corresponds to a final position selected during the previous cursor mode, so that the user is able to reposition the input device in the case when it has (or was about to) "run off the edge" of an input tablet which is relatively smaller than the display.

In a presently preferred embodiment, the system uses either a resistive touchpad input tablet, or a capacitive touchpad input tablet in conjunction with a stylus having a flexible conductive writing tip.

In alternative embodiments, the system provides a signature mode, in which the user is able to make a simple drawing, such as a handwritten signature.

BRIEF DESCRIPTION OF THE DRAWING FIGURES

DETAILED DESCRIPTION OF THE PREFERRED EMBODIMENT

Those of ordinary skill in the art will realize that the following description of the present invention is illustrative only and not in any way limiting. Other embodiments of the invention will readily suggest themselves to such skilled persons.

Figure 1:
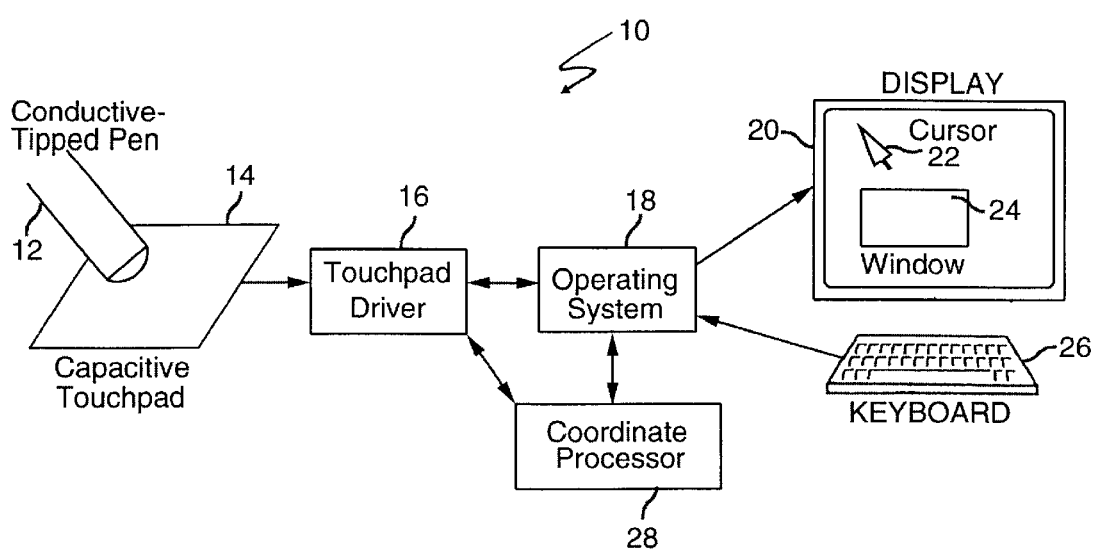
FIG. 1 is a block diagram of an input device for creating drawings on computers according to the present invention.

Referring first to FIG. 1, a block diagram of a drawing input system 10 according to the present invention is shown. In the preferred embodiment, a user will use a conductive-tipped pen or stylus 12 to write on a capacitive touchpad 14. The capacitive touchpad can operate in numerous ways, including, but not limited to, the principles disclosed in either U.S. Pat. No. 5,374,787 to Miller et al. or U.S. Pat. No. 5,305,017 to Gerpheide. The use of a conductive-tipped pen used with a capacitive touch pad is disclosed in the prior art, in U.S. Pat. No. 4,639,720 to Rympalski.

Those of ordinary skill in the art will also appreciate that the invention disclosed herein also applies to any tablet without a display or proximity sensing, such as a resistive tablet. The output of the capacitive touchpad 14 is sent to a touchpad driver 16, which normally processes the (X,Y,Z) absolute mode output of the touchpad into relative mode packets sent to the operating system 18. Such conversion from absolute mode information to relative mode packets is well-known in the art. The operating system 18 then controls a display 20, including the position of a cursor 22, and any graphics in a window 24. The operating system receives input from a keyboard 26.

The steps described in this invention are executed by a coordinate processor 28, which has access to the absolute mode information from the touchpad in the form of absolute data packets. The coordinate processor can also prevent the touchpad driver 16 from issuing relative mode packets to the operating system. In addition, the coordinate processor 28 communicates with the operating system to accept keyboard input from keyboard 26, draw graphics in window 24, and manipulate the cursor 22. The coordinate processor 28 will typically be part of a graphics application as known in the art.

The method of operation of the coordinate processor 28 can best be understood by those of ordinary skill in the art if expressed as pseudo-code. The pseudo-code set forth below in Table 1 describes the currently preferred embodiment of the invention. Other embodiments are readily apparent to those skilled in the art.

TABLE 1

Pseudocode

The touch pad starts in relative mouse mode
Has the user hit a space bar or performed a tap gesture in relative mouse mode?
{
    Turn off system cursor motion and behavior
    Display a cross cursor
    Set timer to 3 seconds
    Let offset = current cursor position in touchpad coordinates
    Let firstInk = TRUE
    Let currentStroke = empty
    A:
    Is there a touchpad (X,Y,Z) packet available?
    {
        pnt = (X,Y)
        if (Z > threshold)
        {
            if (firstInk)
            {
                firstInk = FALSE
                stop displaying cursor
                let offset = offset-pnt
            }
            reset timer to 400 milliseconds
            pnt = pnt+offset
            if (currentStroke is not empty)
            {
                draw line from prevPnt to pnt
            }

TABLE 1-continued

Pseudocode

```
            append pnt to currentStroke
            let prevPnt = pnt
        }
        else if (currentStroke is not empty)
        {
            save currentStroke in data structure
            let currentStroke = empty stroke
        }
    }
    Has the timer expired?
    {
        Turn system cursor back on
        Display system cursor
        Return to relative mouse mode
    }
    goto A
}
```

Figure 2:
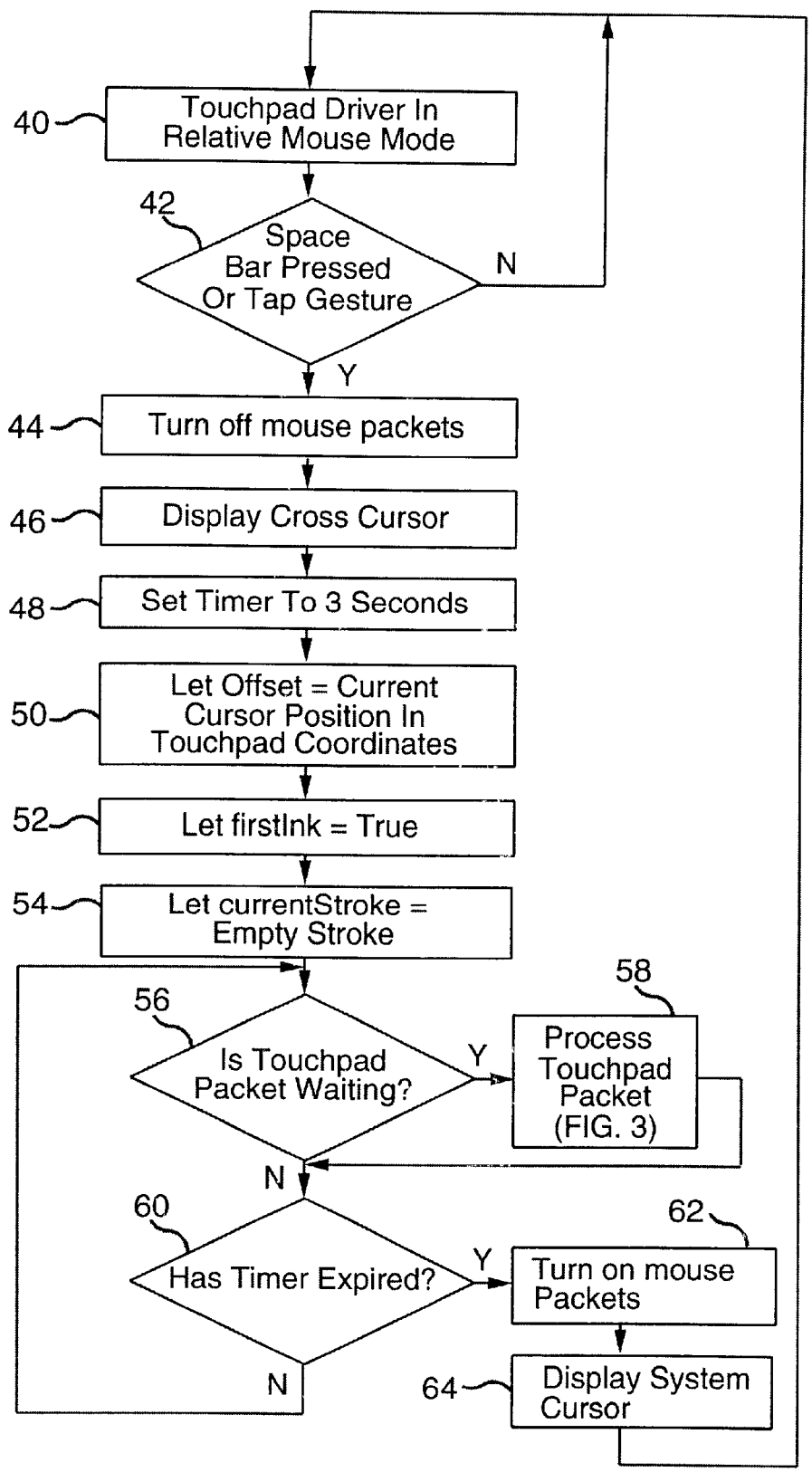
FIG. 2 is a flowchart describing the operation of the method of the present invention, showing the processing of the inputs as a busy-wait loop.
Figure 3:
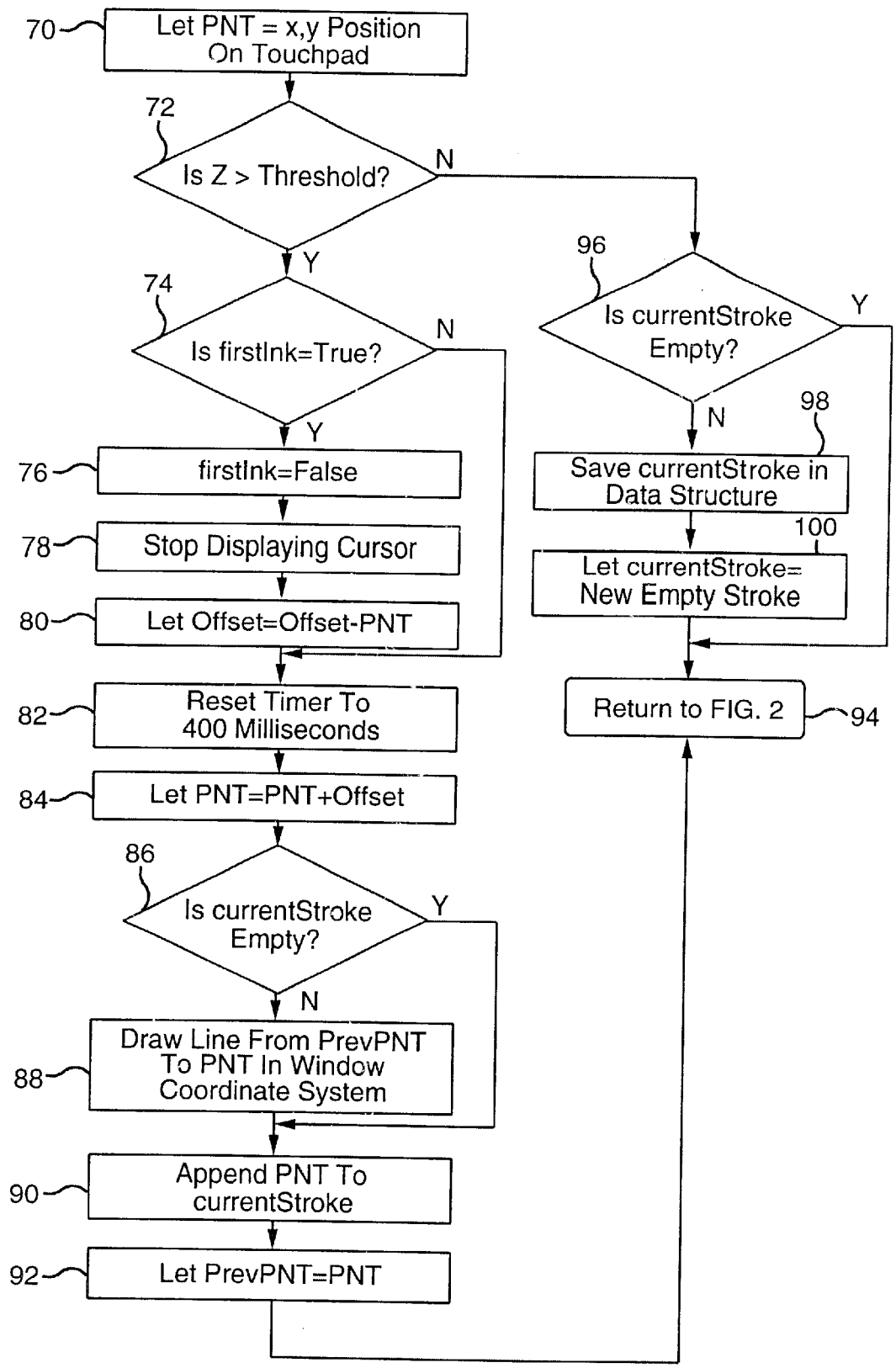
FIG. 3 is a flowchart describing the touchpad packet processing of the current invention.

FIG. 2 and FIG. 3 describe the method of the present invention as a flowchart. Referring first to FIG. 2., the touchpad driver starts in relative mouse mode at step 40. Step 42 determines whether the space bar has been pressed or a tap gesture has been executed. If not, the touchpad driver stays in relative mouse mode. Other keystrokes or gestures can be used in step 42, as is obvious to those skilled in the art.

Alternatively, if a pen with a switch or button is used, activating the switch or button can place the system in absolute mode. Furthermore, in a message-based operating system like Windows 95, the CPU does not need to execute an infinite loop to wait for a keystroke or a touchpad gesture. The coordinate processor will remain idle until a keystroke message or a gesture message is sent to it.

If the space bar has been pressed, or the tap gesture has been executed, the coordinate processor then will instruct the touchpad driver to turn off relative mode mouse packets at step 44. This step ensures that the absolute mode motions will not be interpreted by the operating system as mouse moves or button clicks. At step 46, the coordinate processor will then display a cross cursor at the current cursor position. The cross cursor is a hint to the user that the system is in absolute mode. Step 46 is an optional enhancement to the system and is not necessary to the invention. At step 48, the coordinate processor sets a timer to three seconds. This timer will send a signal to the coordinate processor three seconds after step 48 has executed, then the timer will expire.

The purpose of the timer is to automatically set the system back into relative mouse mode when the timer expires, with no intervention of the user. If the user selects absolute mode, three seconds are allotted to draw something, or the system will revert back to relative mode. The interval of three seconds is illustrative and is not limiting in any way: it can be set to according to a user preference; Those of ordinary skill in the art will recognize that the time needs to be greater than 500 milliseconds or else it will time out before the user can start drawing.

Figure 4:
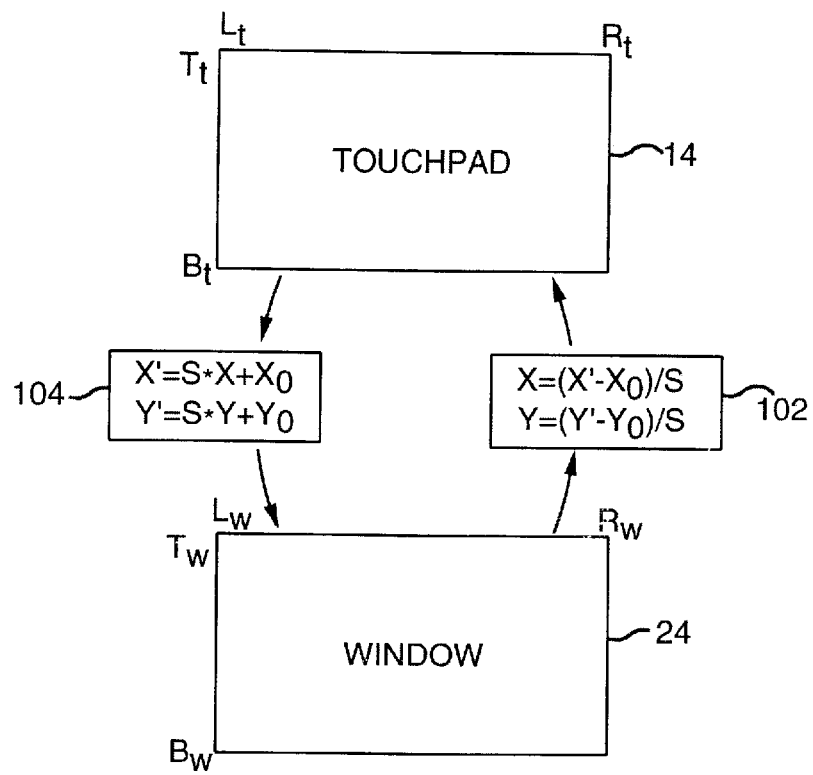
FIG. 4 is a diagram illustrating how to perform the mapping of the coordinate systems in the system of the present invention.

Step 50 will set the offset variable to be the current cursor position mapped into the touchpad coordinate system. FIG. 4 further explains how to perform the mapping of the coordinate systems: The offset variable is used to create the following behavior: The user will position the mouse cursor where it is desired to draw ink. Then, no matter where on the touchpad they start to draw ink, the first ink point will be aligned with the last cursor position. The offset variable will be used to compute the translation of the touchpad coordinate system to ensure this behavior. Step 52 sets the variable firstink to be TRUE. The firstink variable will be used in the offset computation. Step 54 then sets the currentStroke variable to be a new, empty stroke. As the user draws a figure, the coordinates of the current stroke will be stored in the currentStroke variable, which can be a list or an array. As will be apparent to those of ordinary skill in the art, steps 44 through 54 may be performed in any order.

After step 54, the coordinate processor is ready to accept input from either the touchpad or the timer. At step 56, the coordinate processor determines whether a touchpad packet is available. Such a packet comprises the X, Y, and Z (pressure) data at one point in time reported by the touchpad driver. If such a packet is available, then the touchpad packet processing to be described with reference to FIG. 3 is invoked at step 58. In any event, the coordinate processor then determines at step 60 whether the timer has expired. If it has, then step 62 will instruct the touchpad driver to allow the production of relative mode mouse packets. Step 64 then restores the display of the system cursor. Steps 62 and 64 may be performed in any order. The system will then go back to step 40.

In the flow diagram of FIG. 2, the processing of these inputs is illustrated as a busy-wait loop. As in step 42, it is obvious to those skilled in the art that the coordinate processor will wait for either a touchpad packet message or a timer message, and will otherwise remain idle.

Referring now to FIG. 3, a flow diagram describes the touchpad packet processing according to the presently preferred embodiment of the current invention. The processing begins at step 70, where the variable pnt is loaded with the X and Y positions on the touchpad. Step 72 then determines whether the Z value (the pressure) is above a threshold. If this value is above the threshold, then the pen or finger has been applied to the touchpad. If this value is below threshold, then the pen or finger pressure is considered to be too small for reliable measurement. If the Z value is above threshold, then processing flows to step 74, where the variable firstink is examined. If firstink is TRUE, then the offset computation is finished in steps 76 through 80, which may be performed in any order. Step 76 sets firstlnk to FALSE, in order to ensure that the offset processing happens only once every time through the processing of FIG. 2. Step 78 then stops displaying the cross cursor and step 80 subtracts the value of the pnt variable from the value of the stored offset variable. After step 80, the offset variable contains the translation necessary to align the first ink position with the original cursor position. After step 80, or if firstlnk is FALSE at step 74, processing flows to step 82.

Step 82 will reset the timer. As presently preferred, the timer interval is 400 milliseconds. This interval is illustrative only and can be tuned for user preference. If no packets are received for 400 milliseconds whose Z values are above threshold, then the timer will expire and the system will revert to relative mouse mode. Step 84 performs the offset translation discussed at step 80, above. Steps 82 and 84 may be performed in any order.

Step 86 determines whether the current stroke is empty. If it is not empty, then the processor draws a line from the previous point (whose location is stored in the variable prevpnt) to the current point at otep 88. This line is drawn in the window 24 of the display 20, hence is computed in the window's coordinate system. In any event, step 90 is executed, which appends the current point location to the current stroke. Finally, step 92 will assign the value of the current point to the prevPnt variable. Control will then flow back to FIG. 2 at step 94.

If at step 72, the Z value is below threshold, then step 96 determines whether the current stroke is empty. If it is not, then the Z value dropping below threshold signals the end of the stroke. Step 98 then saves the current stroke in a data structure of the application. The data structure is necessary for redisplay, saving to disk, or further processing. As is obvious to those of ordinary skill in the art, the structure can be a list or array of all strokes drawn so far. Step 100 then creates a new empty stroke and assigns it to the currentStroke variable. If the current stroke is empty at step 96, or after stroke 100, then control flows back to FIG. 2 at step 94.

Step 98 is the output step of the entire coordinate processing. The preferred embodiment assumes that the touchpad will produce at least one below-threshold packet after a stroke is finished. If that is not the case, then steps 96, 98, and 100 must also be performed between steps 64 and 40 of the flowchart of FIG. 2.

FIG. 4 shows the details of the coordinate mapping used in steps 50 (FIG. 2) and 88 (FIG. 3). The touchpad 14 has a bounding box Lt, Rt, Bt, and Tt, as shown in FIG. 4. The window 24 has a bounding box Lw, Rw, Bw, and Tw. Step 50 needs to map window coordinates (X;Y) back into touchpad coordinates (X,Y). Hence, it uses the mapping 102. Step 88 needs to map touchpad coordinates (X,Y)into window coordinates(X,Y) so it uses mapping 104. Mappings 102 and 104 are linear mappings which can map any rectangle into any other similarly shaped rectangle, depending on the values of the parameters Xo, and Yo. The mappings are chosen to preserve the aspect ratio of any input drawings, in order to eliminate distortion.

Figure 5:
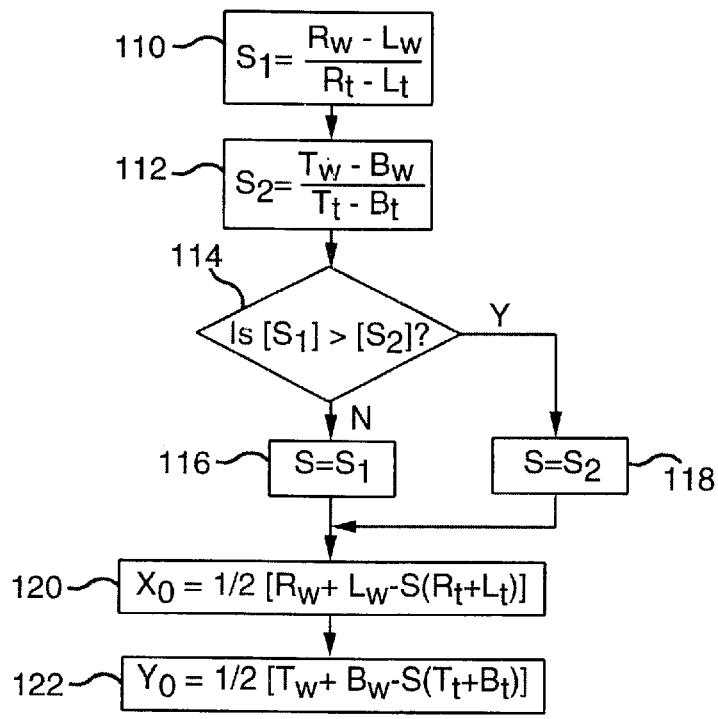
FIG. 5 is a flowchart illustrating how to compute the parameters s,Xo, and Yo in the system of the present invention.

According to the presently preferred embodiment of the invention, the parameters s, Xo, and Yo are computed via the method illustrated in the flowchart of FIG. 5. These parameters depend on the current size of window 24 at the time either of steps 50 or 88 are executed. The method illustrated in FIG. 5 will determine the mappings of the touchpad into the largest possible rectangle that fits and is centered within the current window while still preserving the aspect ratio of the touchpad. Step 110 computes the scaling that would make the horizontal extent of the touchpad 14 map to the horizontal extent of the window 24. Step 112 computes the scaling that would make the vertical extent of the touchpad 14 map to the vertical extent of the window 24. Steps 110 and 112 can be performed in any order. Step 114 compares the absolute values of these two scalings. Steps 116 and 118 choose the scaling that has the smallest absolute value. The scalings can be negative, due to differences in handedness of the coordinate systems. Steps 120 and 122 compute the translation necessary to bring the center of the touchpad 14 to the center of the window 24. Steps 120 and 122 can be performed in any order. The offset applied at step 84 of the flowchart of FIG. 3 applies a translation in addition to the translation computed at steps 120 and 122.

Simple variations on the preferred embodiment will be obvious to those skilled in the art. For example, the preferred embodiment of the present invention describes a drawing program. A painting program can be easily created with the same user interface, where the output of the coordinate processor 28 is not a list of strokes, but is the final bitmap in the window 24. Also, the drawing program can quite easily be made to zoom and pan, by adding a third coordinate system for the stored data. Steps 50 (FIG. 2) and 70 (FIG. 3) could easily be modified to produce positions in the third coordinate system.

As an alternative embodiment, the coordinate processor 28 can be dramatically simplified, in order to provide a user interface for very simple drawings, such as a signature. Most users know how to write their signature in one fluid motion and do not need to reposition the cursor in between strokes. Therefore, steps 50, 80, and 84 can be omitted. In this case, the mapping between the touchpad coordinates and the window coordinates will not be translated by the offset variable. In addition, a new step 50 can be added to empty the entire data structure of the application, so that one tap or keystroke can capture an entire signature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of using a drawing input device comprising:

starting a touchpad driver in a relative mouse mode, wherein mouse packets are on;

detecting a user draw command;

disabling relative mouse mode in response to said user draw command, wherein said mouse packets are off;

providing an offset value for the start of a first drawing stroke equal to the present cursor position;

processing information defining user input drawing strokes; and enabling relative mouse mode after a fixed time period during which no user input drawing strokes have been made, wherein said mouse packets are on.

2. The method of claim 1 further comprising:

disabling a system cursor and enabling a draw mode cursor in response to said user draw command; and disabling said draw cursor and enabling said system cursor after said fixed time period.

* * * * *